United States Patent [19]
Viertl

[11] 3,927,557
[45] Dec. 23, 1975

[54] ACOUSTIC IMAGING APPARATUS WITH LIQUID-FILLED ACOUSTIC CORRECTOR LENS

[75] Inventor: John R. M. Viertl, Schenectady, N.Y.

[73] Assignee: General Electric Company, Schenectady, N.Y.

[22] Filed: May 30, 1974

[21] Appl. No.: 474,613

[52] U.S. Cl............................................. 73/67.5 R
[51] Int. Cl.².................................... G01N 29/04
[58] Field of Search.............. 73/67.5 R, 67.6, 67.7, 73/71.5; 340/8 L; 350/180

[56] References Cited
UNITED STATES PATENTS

| | | | |
|---|---|---|---|
| 2,300,251 | 10/1942 | Flint | 340/8 L |
| 2,520,634 | 8/1950 | Grey | 350/294 |
| 2,836,101 | 5/1958 | Swart | 350/180 |
| 3,119,892 | 1/1964 | Shenker | 350/199 |
| 3,168,659 | 2/1965 | Bayre et al. | 73/67.5 R |
| 3,461,420 | 8/1969 | Silverman | 73/67.7 |
| 3,614,449 | 10/1971 | Ward | 350/199 |
| 3,688,562 | 9/1972 | Munger et al. | 73/71.5 U |
| 3,780,572 | 12/1973 | Rocha | 73/67.5 R |

OTHER PUBLICATIONS

B. F. McMahon, Liquid Optics – A New Horizon, The Surveyor, pp. 26–28, Nov. 1967, Vol. 3, No. 4.

*Primary Examiner*—Herbert Goldstein
*Assistant Examiner*—Anthony V. Ciarlante
*Attorney, Agent, or Firm*—Donald R. Campbell; Joseph T. Cohen; Jerome C. Squillaro

[57] ABSTRACT

Acoustic echo pulses from an object being examined are focused onto a planar transducer array by a liquid-immersed acoustic focusing system with a meniscus corrector lens. The low loss, low reverberation acoustic lens is filled with a second liquid and has flexible membrane surfaces responsive to the pressure differentials. One lens surface is enclosed exteriorly by a pressure-tight container in which other components of the ultrasonic imaging apparatus are mounted.

6 Claims, 3 Drawing Figures

ACOUSTIC IMAGING APPARATUS WITH LIQUID-FILLED ACOUSTIC CORRECTOR LENS

BACKGROUND OF THE INVENTION

This invention relates to acoustic imaging apparatus for visualizing the internal and external features of objects, and more particularly to an improved acoustical energy focusing system using a liquid-filled acoustic lens as an adjustable corrector element. Typical applications include the visualization of biological organs and tissues, and ultrasonic inspection.

In U.S. Pat. No. 3,780,572 to H. A. F. Rocha, granted Dec. 25, 1973 and assigned to the same assignee, there is disclosed an ultrasonic imaging apparatus comprised by a transmitter for directing periodic acoustic pulses toward the object, a simple concave acoustic reflector for focusing the reflected echo pulses, and an acoustic image converter with a planar sensor array for converting the focused echo pulses into electrical signals. By gating the amplified outputs of the piezoelectric sensors at selected time intervals following generation of an incident acoustic pulse, an image of a planar region at a particular depth within the object is formed on a cathode ray tube or other visual display device. In order to improve the performance of the imaging apparatus, which is immersed in water with the exception of the display device and electrical circuitry, an improved acoustical energy focusing system is needed. Simple acoustical reflectors (mirrors) and lenses, like their optical counterparts, suffer from various aberrations that tend to produce a poorly defined or fuzzy image. Accordingly, one or more aberration correcting lens elements are required to permit control of the various aberrations introduced when the major part of the focusing system, as is preferred, utilizes simple and easily manufactured components.

Solid acoustic lenses suffer from losses due to absorption of acoustical energy and are also subject to internal reverberations resulting from partial reflection at the interface of the lens with the surrounding water. A hollow, liquid-filled lens having solid rigid surfaces still suffers from some acoustic absorption and internal reverberations. Moreover, solid and rigid-surfaced hollow lenses have no degree of adjustability and must be exchanged or permanently altered to change the correction obtained by use of the corrector lens.

SUMMARY OF THE INVENTION

In accordance with the invention, a liquid-filled acoustic lens with flexible membrane surfaces responsive to the liquid pressure differentials is used as an easily adjusted corrector lens in an improved acoustic energy focusing system. This type of acoustic lens has low acoustical losses and low reverberation effects. In the preferred embodiment, a converging meniscus lens is employed to correct the spherical aberration of a reflector system with a concave spherical reflector and an opposing convex spherical reflector that produces a magnified acoustical image. One flexible membrane lens surface is enclosed exteriorly by a pressure-tight container filled with water or other suitable liquid having a pressure different from that of the lens liquid and of the water or other liquid engaging the exterior of the other flexible membrane lens surface. The lens liquid is selected to have the desired index of refraction, which can be changed by using a different liquid or by varying the proportions of a mixture of liquids. Thus, the acoustic corrector lens can be adjusted after assembly in the ultrasonic imaging apparatus by varying the index of refraction and by changing the pressure of the lens liquid and the liquid in the pressure-tight container to thereby adjust the curvature of the lens surfaces and thus the focal length of the lens. A well-focused, sharply defined acoustical image can consequently be obtained. Other components of the apparatus such as the reflector system and the acoustic image converter can be mounted in the pressure-tight container.

The improved acoustic focusing system is used in combination in the ultrasonic imaging apparatus as previously described for various medical and industrial applications. The acoustic image converter senses the focused acoustical image of a planar object region, and periodically generates electrical output data to be fed to a display device for producing visual images, all under the control of suitable control circuitry.

BRIEF DESCRIPTION OF THE PREFERRED EMBODIMENT

Figure 1:
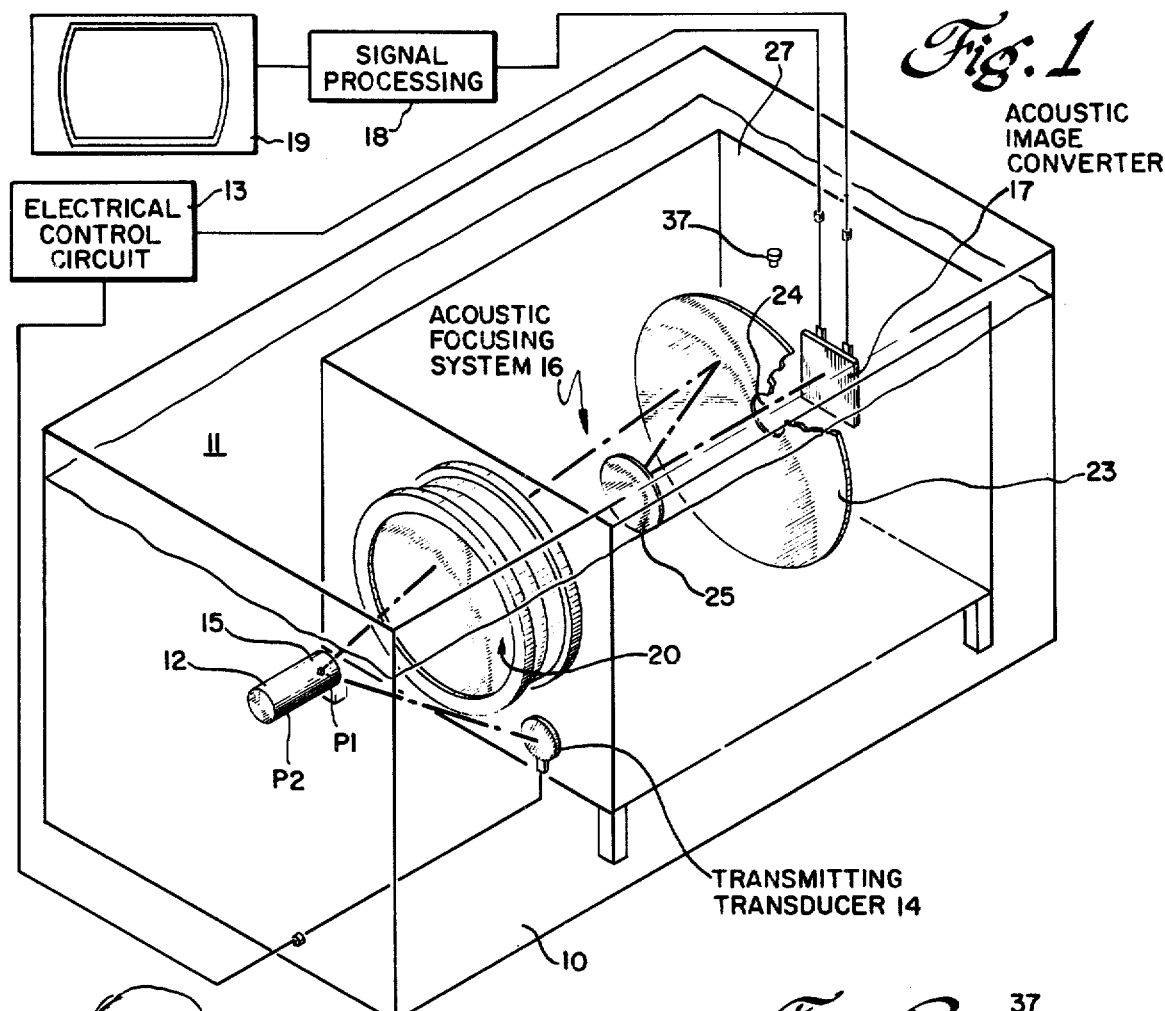
FIG. 1 is a simplified perspective view of an ultrasonic imaging apparatus constructed according to the invention with an improved acoustical energy focusing system.
Figure 2:
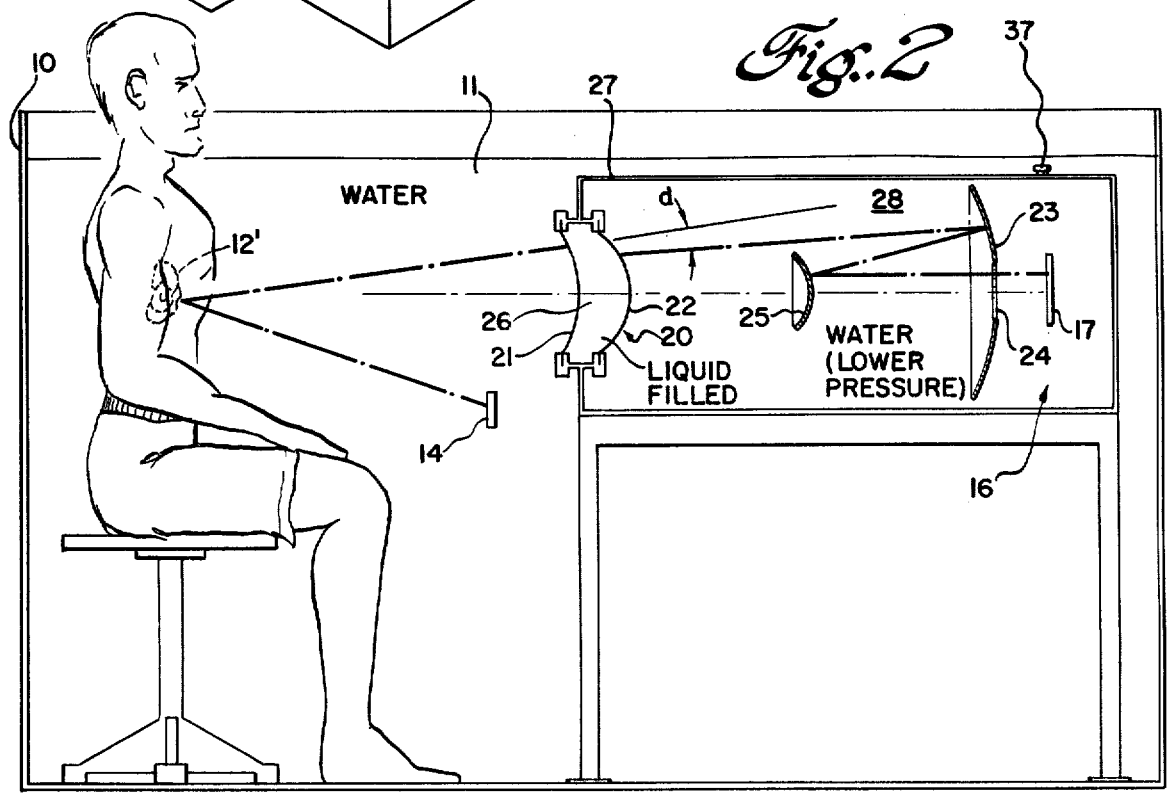
FIG. 2 is a side view of the liquid-immersed imaging apparatus as used for medical examination, illustrating in dashed lines the path of an acoustic ray.

Referring to FIGS. 1 and 2, the object being examined and the entire ultrasonic imaging system, with the possible exception of the electrical circuitry and the visual display equipment, are immersed in a tank 10 filled with water 11 or other suitable liquid. As here constructed, the ultrasonic imaging system produces a magnified image of the object and the components are arranged to be most suitable for medical applications, such as visualizing the human heart 12' as is illustrated in FIG. 2. Before proceeding to a detailed description of the improved acoustical energy focusing system, the structure and operation of the imaging apparatus will be reviewed briefly. For this purpose, and to illustrate another large class of applications for ultrasonic inspection, the object 12 shown in FIG. 1 is by way of example a shaft or other metallic workpiece being inspected for internal flaws.

Upon being excited periodically by an electrical control circuit 13 containing a burst generator, a train of acoustical energy pulses are generated by a transmitting transducer 14 and directed toward the object 12. The frequency of the electrical excitation applied to the piezoelectric transducer 14 is typically in the range of 1-10 MHz, and the acoustic pulses have a period of about 10 milliseconds to allow sufficient time between succeeding pulses for acoustic reverberations to subside within the tank 10. The reflected or scattered acoustical echo pulses derived at each acoustic heterogeneity such as the front and back of object 12 and the flaw 15 within the object are produced at varying times after the launch of each acoustic pulse, depending upon the distance from transmitter 14. By acoustic heterogeneity is meant a separation surface between two media having different acoustic impedances. The train of echo pulses emanating from the object 12 are focused by an acoustic focusing system, indicated generally at 16, to form images at the plane of an acoustic image converter 17 having an $n^2$ array of acoustical transducers. The planar piezoelectric transducer array converts the spatial distribution of the acoustical pressure waves incident on one surface thereof into a corresponding array of electrical signals, each of which is sensed and selectively stored in a single stage shift register or other suitable storage element.

By appropriately timing the gating of the sensed electrical signals to the parallel-entry shift registers with respect to the launching of each incident acoustical pulse, electrical data is stored from which the image of a selected planar region in the object 12, such as the plane P1 containing the flaw 15, can be formed. By changing the timing of the gating signals in succeeding acoustic pulse periods under the control of the electrical control circuit 13, electrical data can be stored from which the image of other planar regions at different depths, such as the plane P2, can be formed. To obtain the two-dimensional image of a planar region in each periodic time frame, the stored electrical data is read out periodically from the acoustic image converter 17 under control of electrical control circuit 13. The read-out data is optionally stored in a memory and is then fed to a signal processing unit 18 and suitably processed to be supplied serially to a cathode ray tube 19 or other visual display device. Assuming a 10 millisecond interval between incident acoustic pulses generated by transmitting transducer 14, information is read out of acoustic image converter 17 and an image of a selected planar object region is formed on the cathode ray tube 19 at corresponding intervals. For further information, reference may be made to the previously mentioned Rocha U.S. Pat. No. 3,780,572. In either case, whether the acoustic echo pulses are reflected from the object or scattered from the object, the quality of the visual image is dependent to a considerable degree on the quality of the acoustical image formed by the acoustic focusing system 16 and which is sensed by the planar transducer array in acoustic image converter 17.

The acoustic focusing system 16 includes, as the main acoustic lens and reflector elements, a liquid-filled meniscus corrector lens 20 having flexible membrane surfaces 21 and 22, a concave spherical reflector or mirror 23 having a circular central opening 24, and an opposing convex spherical reflector or mirror 25. In this arrangement, the meniscus corrector lens 20 is a converging lens to correct for the spherical aberration of the reflector system 23, 25. The three components are mounted on the acoustic axis such that acoustic pulses emanating from the object 12', as illustrated by the path of a selected dashed acoustic ray, are slightly converged by the acoustic lens 20, and are then reflected by the concave reflector 23 toward the opposing convex reflector 25. The echo pulses reflected through the opening 24 are brought to a focus by the convex reflector 25 at the plane of the transducer array in the acoustic image converter 17. As will be explained in greater detail, the meniscus corrector lens 20 is pressuretight and is filled with an appropriate liquid 26 having a selected index of refraction different from that of water. To obtain the proper radii of curvature of the flexible membranes 21 and 22 to form a meniscus lens, which is a concavoconvex or crescent shaped lens, the pressure of the liquid 26 inside the lens is less than that of the tank water 11 engaging the front of the lens, while the pressure of the liquid engaging the back of the lens is less than that of the liquid 26 inside the lens. For this reason, the exterior of flexible membrane 22 is enclosed by a pressure-tight container, and to this end the meniscus corrector lens 20 is mounted in an opening in one wall of a pressure-tight container 27 filled with water 28 at a lower pressure than that of the liquid 26 inside the lens. Rather than impose an additional solid wall between the lens 20 and the reflector system 23, 25, the pressure-tight container 27 is enlarged so as to enclose not only the reflectors 23 and 25, but also the acoustic image converter 17. The transmitting transducer 14 can be mounted off axis in the tank as illustrated, or on the acoustic axis in the shadow region of reflector 25 either in front or behind the acoustic lens 20.

The focusing reflector system 23, 25 produces a real image and functions as a low power, high aperture magnifier. The concave reflector 23 and the opposing convex reflector 25 are preferably metal reflectors, such as highly polished brass, so as to be good reflectors with low acoustic absorption, and both are easily manufactured spherical surfaces. The diameter of the convex reflector 25 is reasonably small to minimize the obstruction of acoustic rays at either side of the acoustic axis. Relatively small objects can be examined with this focusing system since typically the image produced is three to five times larger. For instance, assuming that the separate piezoelectric transducers in the array in acoustic image converter 17 have a size of 3 millimeters, the spacing of features in the object that can be detected by separate transducers is then 1 millimeter to 0.5 millimeter, resulting in a well-defined image with good resolution. Although effective and inexpensive to manufacture, the focusing reflector system 23, 25 has the disadvantage of a large amount of spherical aberration which increases as the aperture of the system increases. In this acoustic aberration, as with the optical counterpart, acoustic rays incident on the outside of reflector are focused at a plane closer in than the plane at which rays near to the axis are focused. Unless corrected, this contributes to the production of a fuzzy image.

Figure 3:
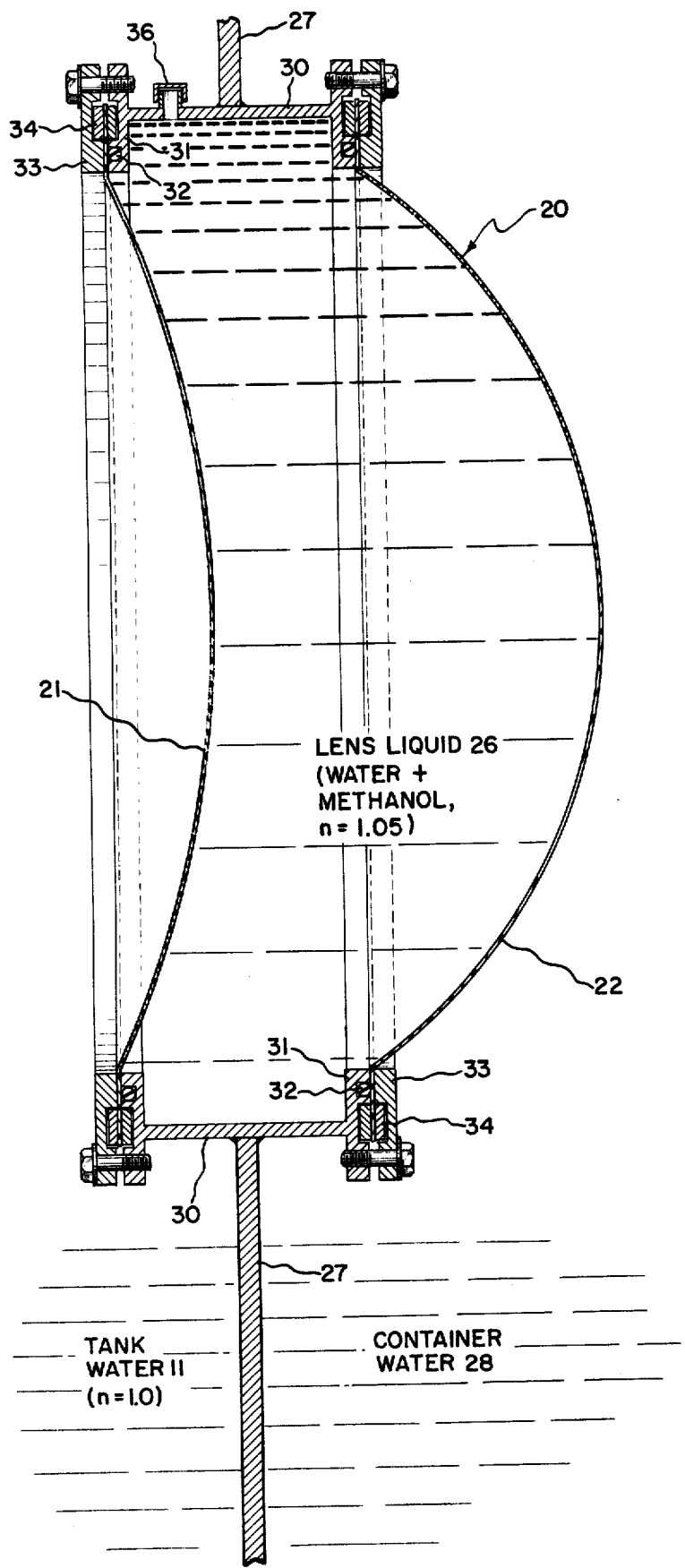
FIG. 3 is an enlarged cross section through the liquid-filled converging meniscus corrector lens with flexible membrane surfaces.

The easily adjusted converging meniscus corrector lens 20 with low acoustic losses and small reverberation effects more particularly is constructed as shown in FIG. 3. The front surface and back surface flexible membranes 21 and 22 are made of a thin sheet of Teflon (trademark of the Dupont Company) or other suitable plastic or flexible sheet material. A rigid, strong frame for the plastic flexible membranes is provided by a metal cyclinder 30 having a pair of circular end flanges 31 with O-ring seals 32 to achieve a pressure-tight engagement, the peripheries of the flexible membranes being clamped to the end flanges 31 by means of cover rings 33. For greater mechanical strength, the edge of each flexible membrane is clamped between a pair of rings 34 which in turn are engaged in opposing recesses in end flange 31 and cover ring 33. In the converging meniscus corrector lens 20, the liquid 26 inside the lens is selected to have an index of refraction slightly greater than that of the water outside the lens. The ultrasonic velocity inside the lens is then less than the ultrasonic velocity in the outside water. It may be noted that a solid acoustic lens is not suitable for this application since the reverse situation exists. Defining an index of refraction of 1.0 in water, the index of refraction of liquid 26 is typically in the range of 1.05–1.10. A mixture of water and methanol can be used, varying the proportions to obtain various indexes. Other liquids can be used, of course, and a desirable feature of the lens liquid is that it effects a temperature compensation of the refractive index over the temperature range of interest. This may require a mixture of three liquids.

The radius of curvature of the front surface flexible membrane 21 is determined by the pressure difference between the tank water 11 and the lens liquid 26. As was previously mentioned, the pressure of the liquid 26 is lower than that of tank water 11, and is adjustable by admitting or withdrawing liquid through a valve 36 in the metal cylinder 30 to thereby selectively change the focal length of the lens. For this application the focal length is relatively large. The radius of curvature of the back surface flexible membrane 22 is considerably shorter, and is also adjustable by changing the pressure of lens liquid 26 or by changing the pressure of container 28 by means of a valve 37 in one wall of the pressuretight container 27 (see FIG. 2). This ease of adjustability of the focal length of the acoustic lens is advantageous to fine-adjust the lens for a particular application and to permit greater manufacturing tolerances in the other acoustical components.

The angle of deviation d (FIG. 2) between the incident and emergent rays of the converging meniscus lens 20 is proportional to the radial distance from the acoustic axis, being greater for outside rays as compared to rays near the acoustic axis. This is desirable to correct for the spherical aberration of the reflectors 23, 25. Using the meniscus corrector lens 20, outside rays appear to the reflector 23 as having a lower angle of incidence on its surface. Two major advantages of using a liquid-filled acoustic lens with flexible membrane surfaces are that this type of acoustic lens has low acoustic loss and small reverberation effects. Since the plastic flexible membranes 21 and 22 are very thin, the amount of reverberation of acoustical energy internally of a membrane is small. In the membrane 21, the ultrasonic pressure waves split into a longitudinal and a shear component, however the lens liquid does not propagate the shear wave. This contributes to the production of a sharp, or well-defined image.

In summary, an improved ultrasonic imaging apparatus for medical and industrial applications employs an acoustic focusing system with a liquid-filled acoustic corrector lens to obtain a magnified, sharp, clearly defined acoustic image. By varying the liquid within the acoustic lens and the pressure differentials defining the curvature of the flexible membrane surfaces, the lens is easily adjusted as needed after assembly in the apparatus. Using the principles here discussed, it is evident that other types of liquid-filled acoustic lenses with flexible membrane surfaces can be constructed and employed with other types of acoustical reflector systems than the arrangement specifically described here. For example, a converging concave liquid-filled acoustic lens is obtained when both flexible lens surfaces are exposed to water at the same pressure, the pressure of the lens liquid being less than this. A lens liquid is used wherein the velocity of sound is greater than the velocity in water. In such a concave lens, paraxial rays are absorbed to a lesser extent than marginal rays because the path through the refracting medium is shorter. Hence, the paraxial rays which contribute little to the lens aberrations are less attenuated. In appropriate situations this converging concave lens can also be used to correct for spherical aberration. Within the broader scope of the invention, acoustical lenses to correct for coma and other types of aberrations can be constructed.

Thus, while the invention has been particularly shown and described with reference to a preferred embodiment thereof, it will be understood by those skilled in the art that the foregoing and other changes in form and details may be made therein by those skilled in the art without departing from the spirit and scope of the invention.

What is claimed is:

1. An acoustic imaging apparatus comprising
   a transmitting transducer immersed in a first liquid for generating a train of incident acoustic pulses that are directed toward an object to be examined,
   an acoustic focusing system immersed in said first liquid for focusing on an image plane the acoustic energy emanating from a planar region of the object,
   said acoustic focusing system being comprised by a meniscus corrector lens filled with a second liquid at a selected adjustable pressure and having flexible membrane front and back surfaces that respectively assume a curvature dependent on the pressure difference thereacross, one of said flexible membrane surfaces being enclosed exteriorly by a pressure-tight container filled with said first liquid at a different pressure than the pressure of said first liquid engaging the other flexible membrane surface, said acoustic focusing system further including other reflector system components mounted within said pressure-tight container for forming a magnified image at said image plane,
   an acoustic image converter also mounted within said pressure-tight container immersed in said first liquid for converting the acoustic energy focused periodically at said image plane into electrical output data, and
   means for controlling said transmitting transducer and acoustic image converter to periodically generate said electrical output data from which visual images can be obtained.

2. Acoustic imaging apparatus comprising
   a transmitting transducer immersed in a first liquid for generating a train of incident acoustic pulses that are directed toward an object to be examined,
   an acoustic focusing system including a spherical reflector system for focusing on an image plane acoustical echo pulses emanating from a planar region of the object,
   said acoustic focusing system further comprising a converging meniscus corrector lens filled with a second liquid at a selected pressure and having flexible membrane front and back surfaces that respectively assume a curvature dependent on the pressure difference thereacross, one of said flexible membrane surfaces being enclosed exteriorly by a pressure-tight container filled with said first liquid at a different pressure than the pressure of said first liquid engaging the other flexible membrane surface,
   an acoustic image converter immersed in said first liquid for converting the echo pulses focused periodically at said image plane into electrical output data,
   said spherical reflector system and said acoustic image converter being mounted within said pressure-tight container, and means for controlling said transmitting transducer and acoustic image converter and producing a visual image from said electrical output data.

3. Acoustic imaging apparatus according to claim 2 wherein said spherical reflector system produces a magnified acoustical image of said planar object region and includes a first concave reflector having a central opening and a second opposing convex reflector, said acoustical echo pulses being slightly converged by said meniscus corrector lens and reflected by said concave reflector to said convex reflector and then through said central opening to said acoustic image converter.

4. Acoustic imaging apparatus according to claim 2 wherein said second liquid is a mixture and has a variable index of refraction obtained by varying the proportions of said mixture.

5. Acoustic imaging apparatus according to claim 2 wherein the pressure of said second liquid and the pressure of said first liquid in said pressure-tight container are both adjustable.

6. Acoustic imaging apparatus according to claim 5 wherein the pressure of said second liquid is greater than that of said first liquid in said pressure-tight container engaging the one flexible membrane surface and less than that of said first liquid engaging the other flexible membrane surface.

* * * * *